United States Patent [19]

Jandrasi Frank J.

[11] Patent Number: 4,693,452

[45] Date of Patent: Sep. 15, 1987

[54] VALVE

[75] Inventor: Jandrasi Frank J., Houston, Tex.

[73] Assignee: Triten Corporation, Houston, Tex.

[21] Appl. No.: 839,003

[22] Filed: Mar. 12, 1986

[51] Int. Cl.⁴ .............................................. F16K 3/316
[52] U.S. Cl. ..................................... 251/329; 251/326
[58] Field of Search ......................... 251/326, 329, 327

[56] References Cited

U.S. PATENT DOCUMENTS

| 1,980,495 | 11/1934 | Muir . |
| 2,636,712 | 4/1953 | Lubbock . |
| 2,696,967 | 12/1954 | Wilson et al. . |
| 2,787,438 | 4/1957 | Bauer . |
| 2,815,187 | 12/1957 | Hamer . |
| 2,838,066 | 6/1958 | Harris . |
| 2,998,957 | 9/1961 | Vulliez . |
| 3,044,889 | 7/1962 | Ekedahl et al. . |
| 3,111,137 | 11/1963 | Carlin . |
| 3,197,528 | 7/1965 | Warga et al. . |
| 3,232,577 | 2/1966 | Sargent . |
| 3,409,716 | 11/1968 | Lubey . |
| 3,654,962 | 4/1972 | Fredd et al. . |
| 3,685,707 | 8/1972 | Shapland . |
| 3,726,306 | 4/1973 | Purvis .............................. 251/329 X |
| 3,746,305 | 7/1973 | Zakka . |
| 3,842,861 | 10/1974 | Jandrasi et al. . |
| 3,866,806 | 2/1975 | Shapland, Jr. . |
| 3,964,507 | 6/1976 | Jandrasi et al. . |
| 3,970,283 | 7/1976 | Hind . |
| 3,972,504 | 8/1976 | DiSabatino, Jr. et al. . |
| 3,976,094 | 8/1976 | Jandrasi et al. . |
| 4,033,549 | 7/1977 | Stamer . |
| 4,136,854 | 1/1980 | Ehmig et al. . |
| 4,182,466 | 1/1980 | Fehling et al. . |
| 4,253,487 | 3/1981 | Worley et al. . |
| 4,316,483 | 2/1982 | Jandrasi . |
| 4,331,316 | 5/1982 | Jandrasi . |
| 4,458,879 | 7/1984 | Jandrasi . |
| 4,512,363 | 4/1985 | Jandrasi et al. . |
| 4,518,146 | 5/1985 | Stinson et al. . |
| 4,531,539 | 7/1985 | Jandrasi et al. . |
| 4,554,035 | 11/1985 | Stein et al. . |

FOREIGN PATENT DOCUMENTS

| 240095 | 8/1962 | Australia . |
| 2714933 | 5/1978 | Fed. Rep. of Germany . |
| 1094888 | 12/1954 | France . |
| 624041 | 9/1978 | U.S.S.R. .............................. 251/326 |

OTHER PUBLICATIONS

BAFCO, Inc., Bulletin HP 83/84 A.
BAFCO, Inc., Bulletin HS 83/84 A.
BAFCO, Inc., Bulletin HB 83/84.
J & H Slide Valve Co.
J & H Industries, Inc.
CRANE.

Primary Examiner—Robert G. Nilson
Attorney, Agent, or Firm—Vaden, Eickenroht, Thompson & Boulware

[57] ABSTRACT

Control valve for controlling the flow of material, the valve including a body with an inlet and an outlet, a disc mounted in the body for closing and opening the valve, the disc mounted on a guide which is secured to the body, the guide mounted on a support, and slots extending through the guide and support for the flow of material therethrough. The valve is particularly useful for controlling the flow of erosive and corrosive material.

15 Claims, 15 Drawing Figures

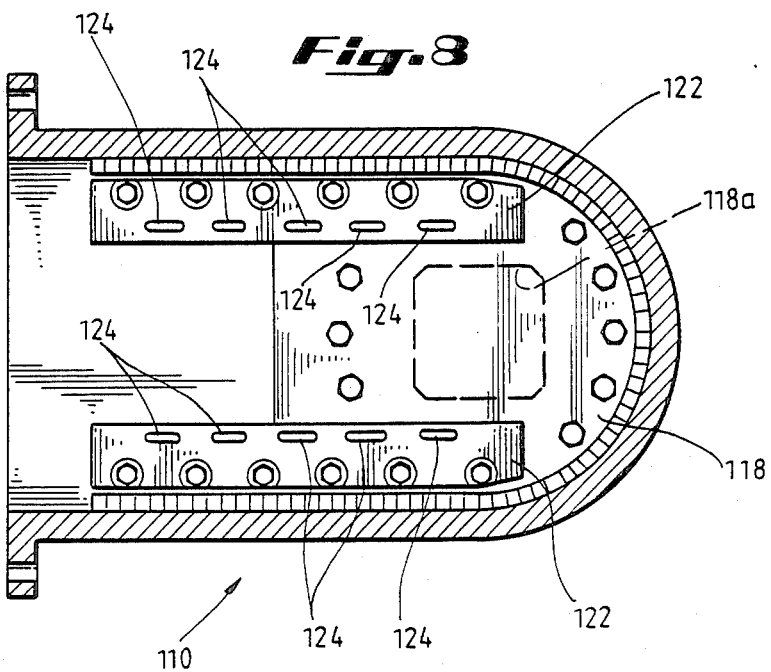
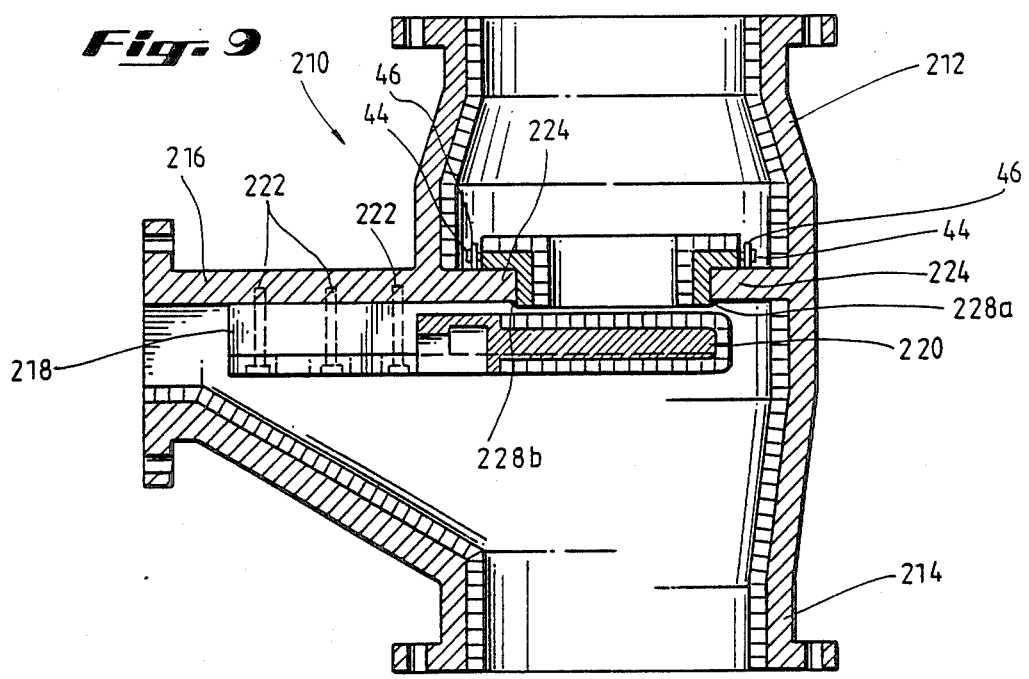

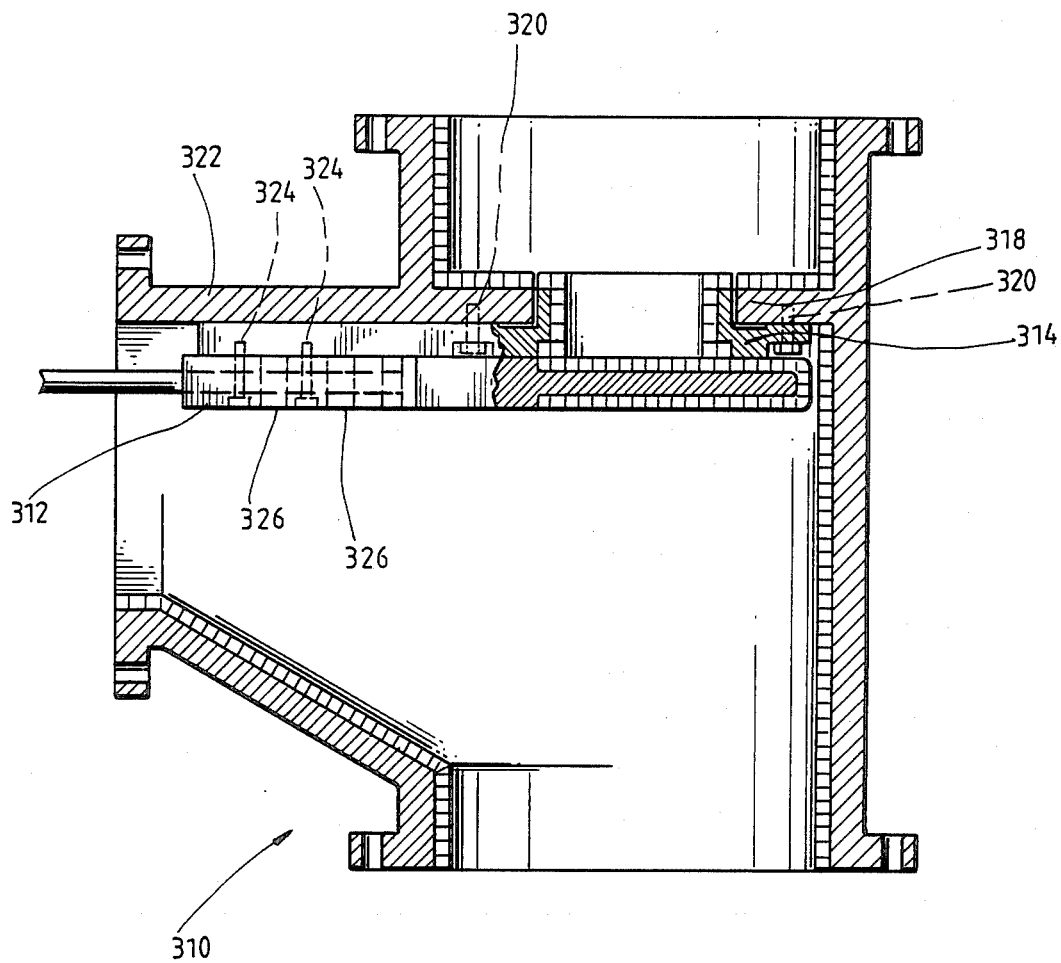

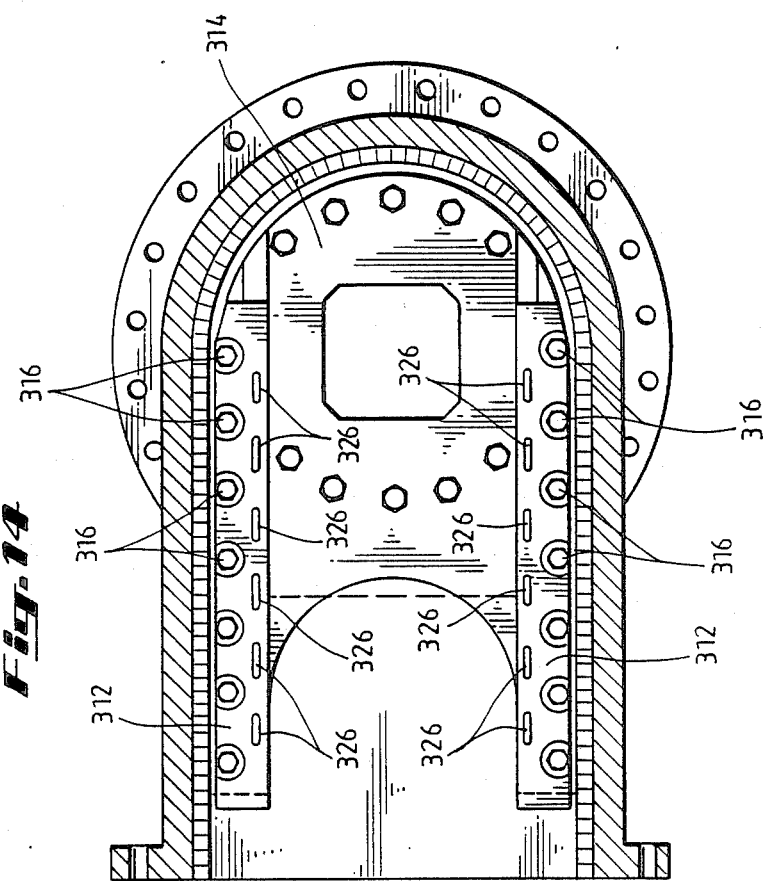
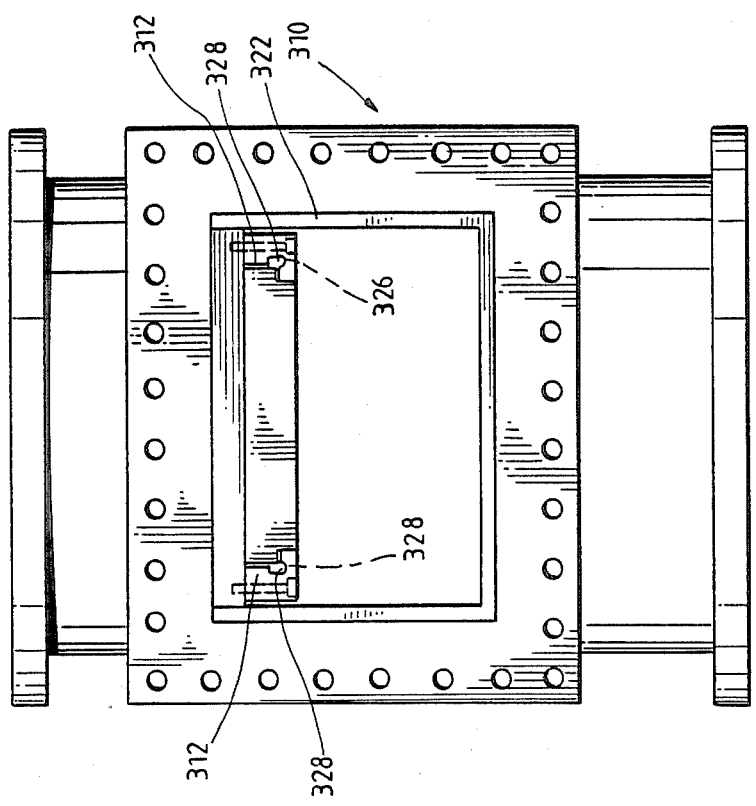

VALVE

BACKGROUND OF THE INVENTION

1. Field of the Invention.

The present invention relates to control valves capable of handling the flow of solid and semi-solid material which is erosive or corrosive in nature such as valves used in handling cold slurries such as in liquefaction or gasification, processes handling raw shale such as the extraction of shale oil, and for handling similar materials such as catalysts used in refining crude oil.

2. Description of the prior art.

Numerous designs of valves (such as slide valves) have been suggested and used for controlling solids flow. The following U.S. Patents are directed to such valves: U.S. Pat. Nos. 132,974; 2,787,438; 3,307,574; 3,701,359; 3,976,094; 4,253,487; 3,842,861; 3,964,507; 4,316,483; 4,331,316; and 4,531,539.

Various problems have been encountered with the prior art valves. In valves in which bolts are used which are exposed to hot material, i.e., in which gate guides are bolted to a valve body and in which an orifice plate is bolted to the body, difficulties are encountered in maintenance because of the bolts' tendency to lock-up after exposure to hot material. Often such bolts need to be cut out. Load carrying bolts which are changed or distorted can result in stretching, changed clearances and in parts which are thus released and fall through the valve. Many bolts used in such applications are made from expensive alloys which are also expensive to work with. Many valves require purging to to keep guides free of catalyst buildup; but frequent purging eats away parts of the guides and gates (or discs). Often guides for gates or discs are restrained such as by being welded to an orifice plate or bolted to an orifice plate or a side of a valve body. Such restraint prevents the guides from "growing" as the temperature increases

SUMMARY OF THE INVENTION

The present invention is directed to a control valve having a body with an inlet for receiving material and an outlet for expelling material. The body also has a bonnet flange in which a gate or disc moves to close-off or open the valve. The gate or disc moves on guides which extend from the bonnet into the valve body. An orifice plate can be provided within the valve body with an opening of desired size to effect and control flow through the valve. The guides which extend from the bonnet into the body are essentially "L"-shaped. In one embodiment the guides have a recess along their entire length and self-cleaning slots from the recess to beneath the valve guides which help inhibit the build-up of solids in the guides (such as catalyst). Rather than bolting the guides to the valve, in one embodiment of the present invention a central indexing tang is used to locate and mount the guide rather than bolts. Such a tang is not used in the embodiments of the present invention in which bolts are used, although the self-cleaning slots may be used with the bolted versions. In another embodiment of the present invention the orifice plate used in the body to affect the size of the opening through the valve can be seal welded in place, eliminating the need for a gasket. Also the orifice plate can be bolted using a side bolted support system which helps solve the problem of distorted bolts or bolts buried in solids. Guides can be provided which are continuous ledges rather than segmented members and are therefore easily correctly alignable. A system of continuous members (rather than segments) can also be used to support the guides. This support or "body shelf" can be a plate welded to the body of the valve. The self-cleaning slots can extend through the guides and the body shelf to permit flow-through of solids thereby inhibiting build-up on the guides. The slots in the body shelf can be fashioned to be substantially similar in shape to the slots through the guides. Because of the frictional forces on the guides and discs, the indexing tangs for the guides can be sized so that they will not be sheared during normal operations. Alignment bolts disposed at the end of the guides can be employed to prevent futher movement of the gate or disc on the guides. At those points on the guides where there is metal-to-metal contact, hardfacing material can be employed to deal with friction and abrasion. Side-inserted reverse flow retaining bolts can be used with the orifice plate to hold it in place in the event of reverse flow. The body can be lined with "Hex" steel and refractory material as desired and the body can be overlaid with corrosion resistant material such as 3081 Stainless Steel.

It is therefore an object of the present invention to provide a new efficient control valve.

Another object of the present invention is the provision of such a valve having self-cleaning guides for the valve's gate or disc.

Yet another object of the present invention is the provision of a control valve in which the guides for the gate or disc are not bolted to the valve body.

Still another object of the present invention is the provision of a control valve in which selected heavy wear areas of the guides are hardfaced.

Still another object of the present invention is the provision of a control valve in which the guides for the gate or disc of the valve are continuous members.

Other and further objects and advantages will be clear to one of skill in this art who has the benefits of the teachings of this invention, when considering this specification, the following description of preferred embodiments, and the accompanying drawings.

BRIEF DESCRIPTION OF THE DRAWINGS

FIG. 8 is a bottom view of the guides and orifice plate of FIG. 6's valve.

FIG. 9 is a side cross sectional view of a valve according to the present invention.

FIG. 12 is a side cross sectional view of a valve according to the present invention.

FIG. 13 is an end view of the valve of FIG. 12.

FIG. 14 is a bottom view of the guides and orifice plate of the valve of FIG. 12.

DESCRIPTION OF PREFERRED EMBODIMENTS

Figure 1:
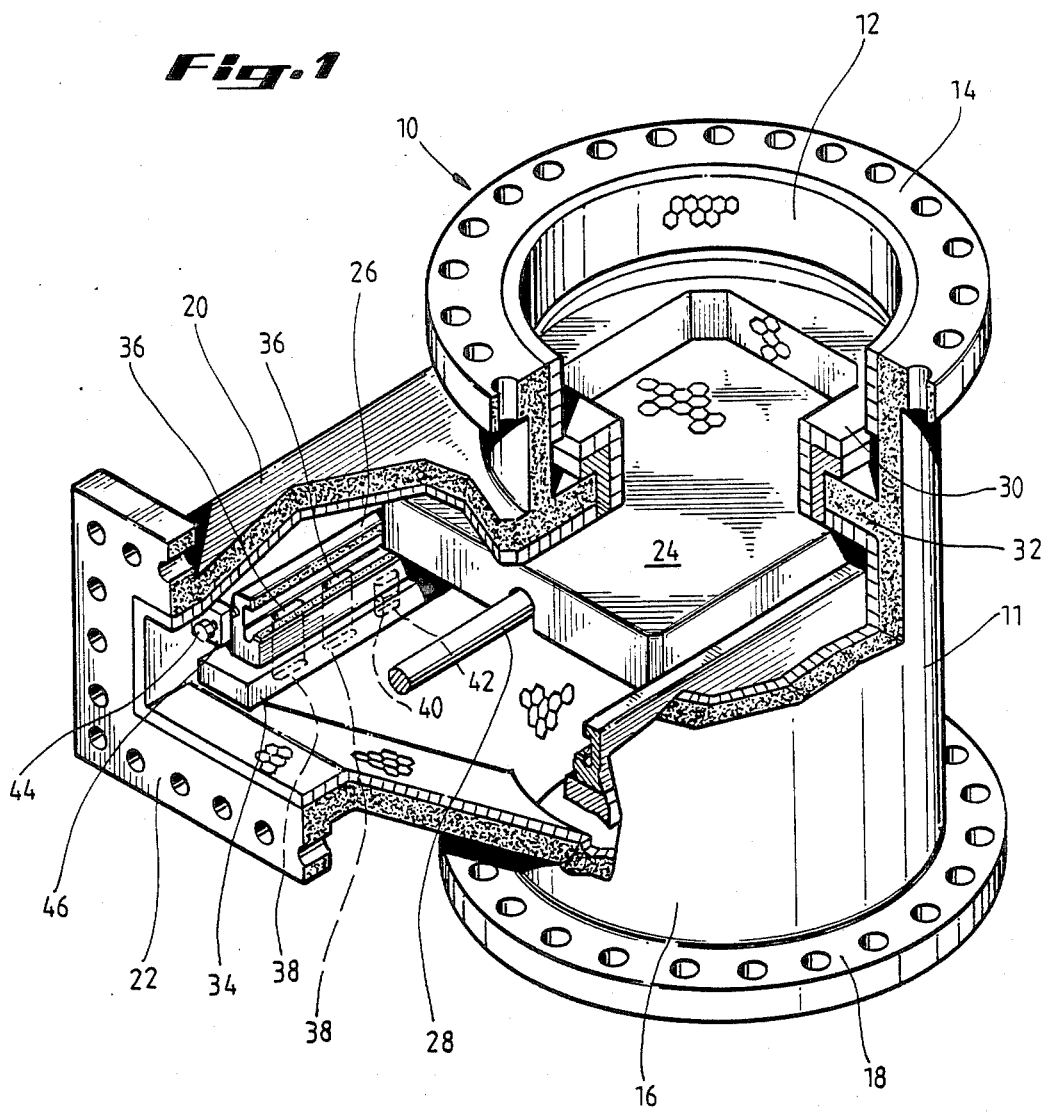
FIG. 1 is a perspective view, partially cut-away, of a valve according to the present invention.

The valve 10 shown in FIG. 1 has the inlet 12 with the inlet flange 14, the outlet 16 with the outlet flange 18 and the bonnet 20 with the bonnet flange 22 all either attached to or formed integrally of the valve body 11. The valve disc 24 is movably disposed within the valve 10 on the valve guides 26 (one shown in FIG. 1). The disc 24 is movable by moving the stem 28 (shown partially in FIG. 1). The orifice plate 30 is disposed within the valve 10 and is mounted on the seat ring 32. As shown in FIG. 1, the valve 10 is closed.

The guides 26 of the valve 10 are supported by the body shelves 34 (one shown in FIG. 1) which are in turn connected to the interior of the bonnet 20 and the valve body 11. The slots 36 extend through the guide 26 and are aligned with the slots 38 which extend through the body shelf 34. The slots 36 and 38 are of substantially the same configuration. The indexing tang 40 extends from the guide 26 into the recess 42 in the body shelf 34. The aligning bolt 44 through the bolt positioning plate 46 (which is connected to the body 11) holds the plate 46 in place to stop the movement of the disc 24 on the guide 26.

Figure 2:
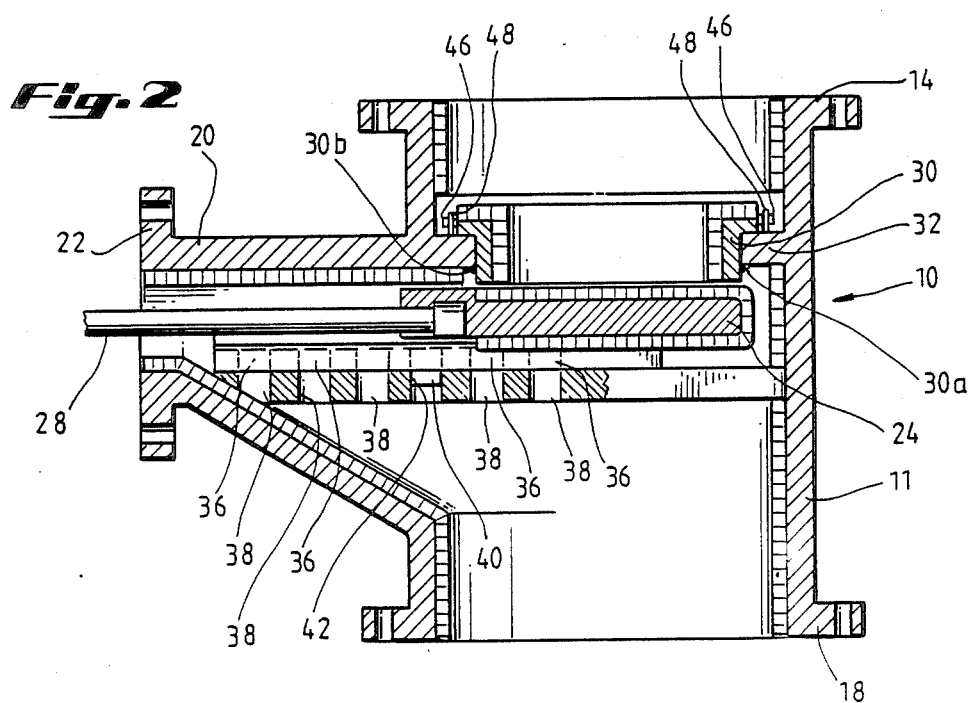
FIG. 2 is a side cross sectional view of the valve of FIG. 1.
Figure 3:
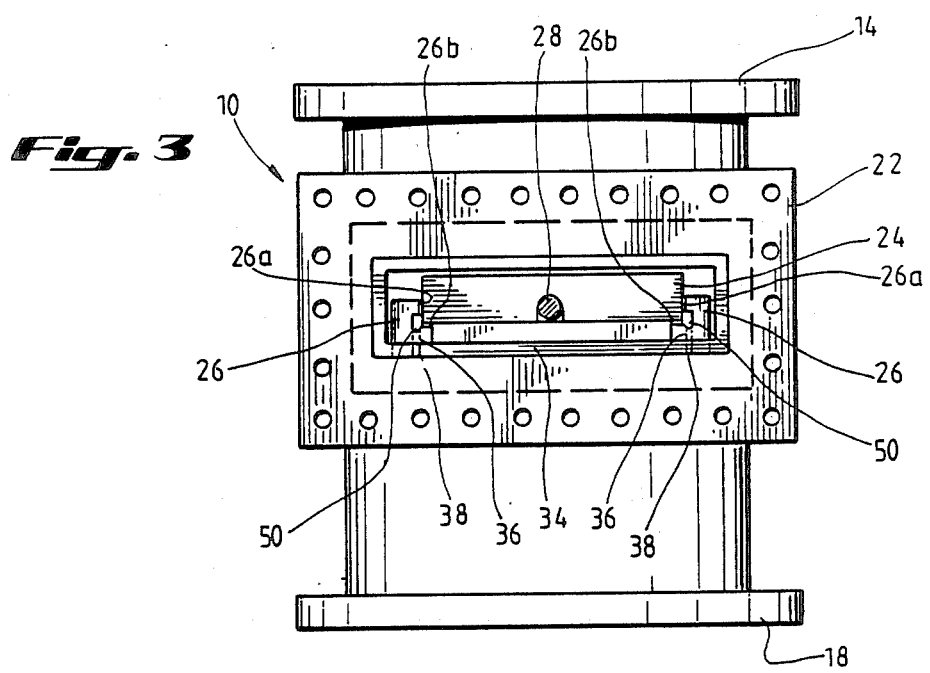
FIG. 3 is an end view of the valve of FIG. 2.

As shown in FIG. 2 the orifice plate 30 of the valve 10 is welded to the seat ring 32 at the points 30a and 30b. The reverse flow retaining bolts 46 which extend through the plates 48 (which are in turn connected to the seat ring 32) prevent the orifice plate 30 from disengaging from the seat ring 32 when there is reverse flow pressure on the orifice plate 30. As shown in FIG. 3, each guide 26 has a recess 50 along its length. Solids such as catalyst which fall on the guides 26 will tend to move into the recess 50. Via the slots 36 in the guides 26 and the slots 38 in the body shelves 34, the solids falling into the recesses 50 flow downwardly and away from the guides. The parts of the guides which contact the disc 24 are hardfaced to reduce wear (areas 26a, 26b in FIG. 3).

Figure 4:
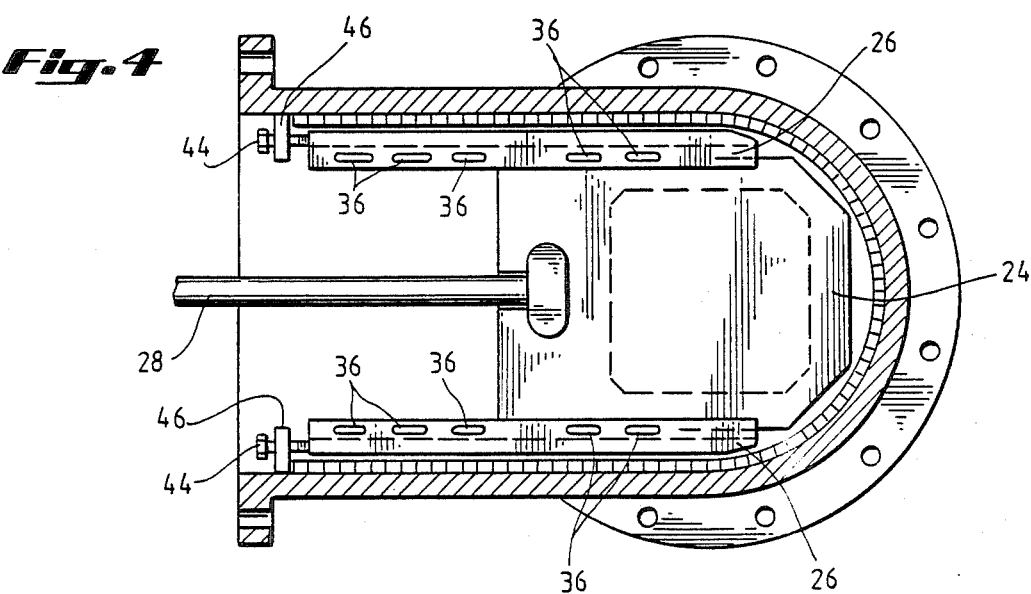
FIG. 4 is a bottom view of the disc, stem and guides of the valve of FIG. 2.
Figure 5:
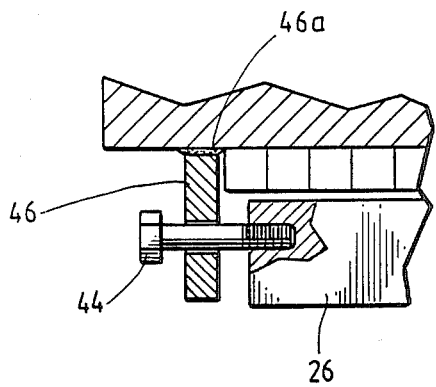
FIG. 5 is a side cross sectional view of end retaining member for the guides of the valve of FIG. 4.

FIG. 4 illustrates the guides 26 and the disc 24 of the valve 10. As shown in FIG. 4 the slots 36 extend along the length of the guides 26, providing a self-cleaning function on the guides for solids such as catalyst which collect on the guides. FIG. 5 is an enlarged view of one of the bolts 44 in one of the plates 46, showing the welding 46a of the plate to the body 11.

The orifice plate 30, as shown in FIG. 2 can be inserted into the valve 10 through the inlet 12, and it is not bolted either from the top or from the bottom. The welds 30a and 30b hold it in place. It is preferred that four reverse flow retaining bolts 46 with the plates 48 be used at the corners of the plate 30. It is preferred that "Hex" steel with refractory material be used to line the valve 10, the orifice plate opening and top and the exterior of the disc 24.

Figure 6:
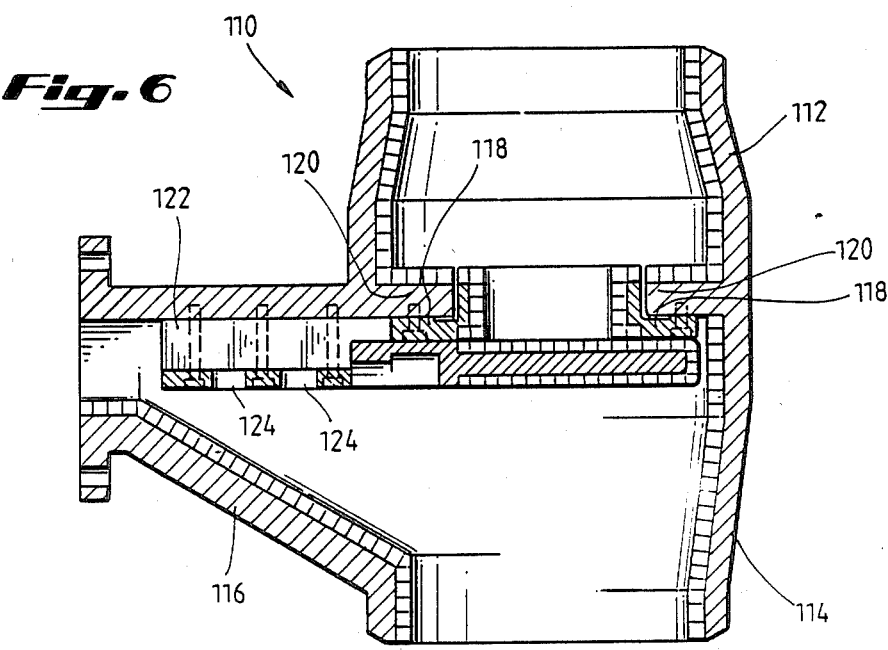
FIG. 6 is a side cross sectional view of another valve according to the present invention.
Figure 7:
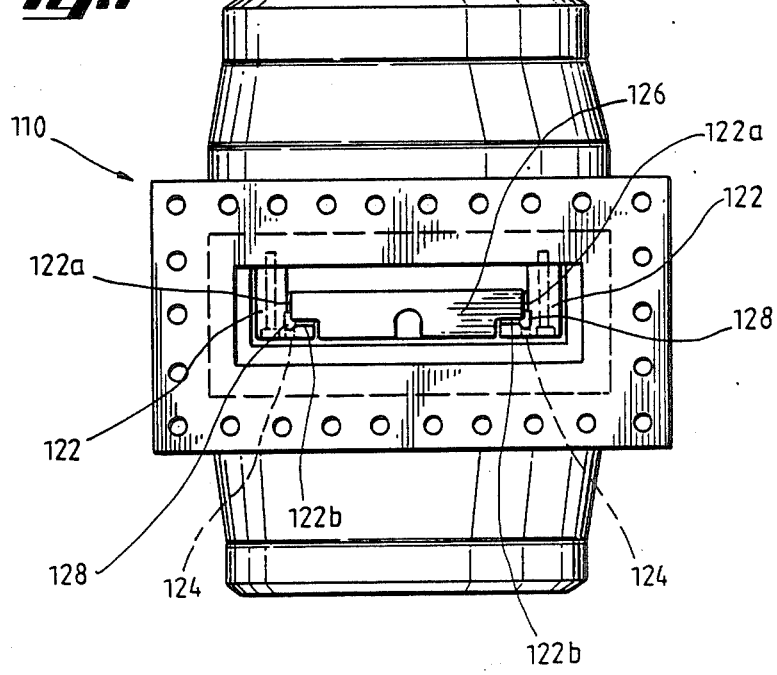
FIG. 7 is an end view of the valve of FIG. 6.

FIG. 6 illustrates the valve 110 according to the present invention which has the inlet 112, the outlet 114 and the bonnet 116. The orifice plate 118 of the valve 110 is bolted from below to the seat ring 120. The guides 122 are bolted to the upper part of the bonnet 116. Self-cleaning slots 124 are provided through the guides 122. The disc 126 moves on the hardfaced portions 122a and 122b of the guides 122. Each guide 122 has a recess 128 therein and therealong for receiving and transmitting solids such as catalyst which may collect in the guides.

As shown in FIG. 8 there is a series of the slots 124 on each guide 122. The opening of the orifice plate (118a) is shown in dotted line form in FIG. 8. Also shown are the bolts 130 which hold the guides 122 and the bolts 132 which hold the orifice plate 118.

Figure 10:
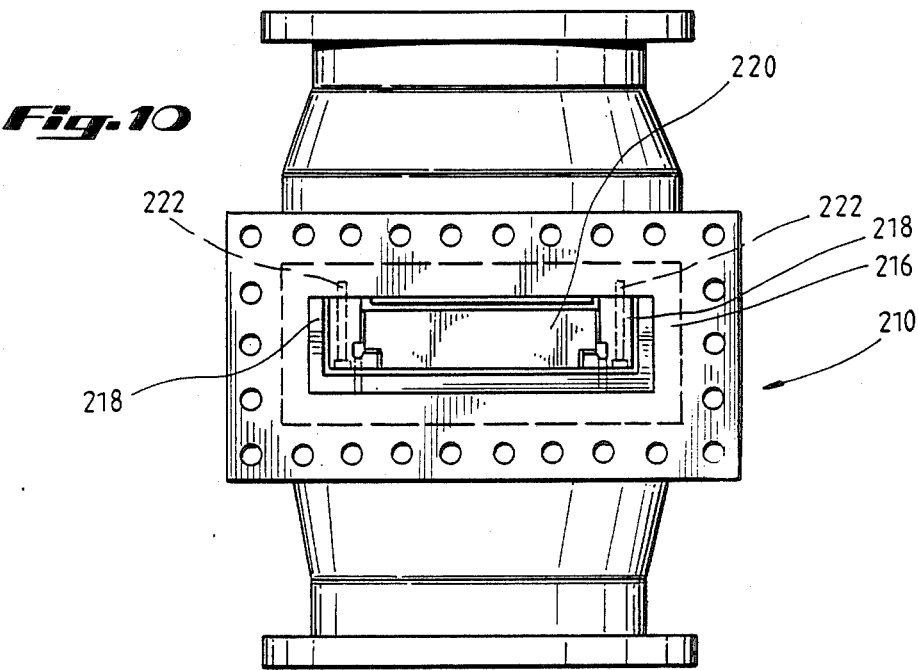
FIG. 10 is an end view of the valve of claim 9.
Figure 11:
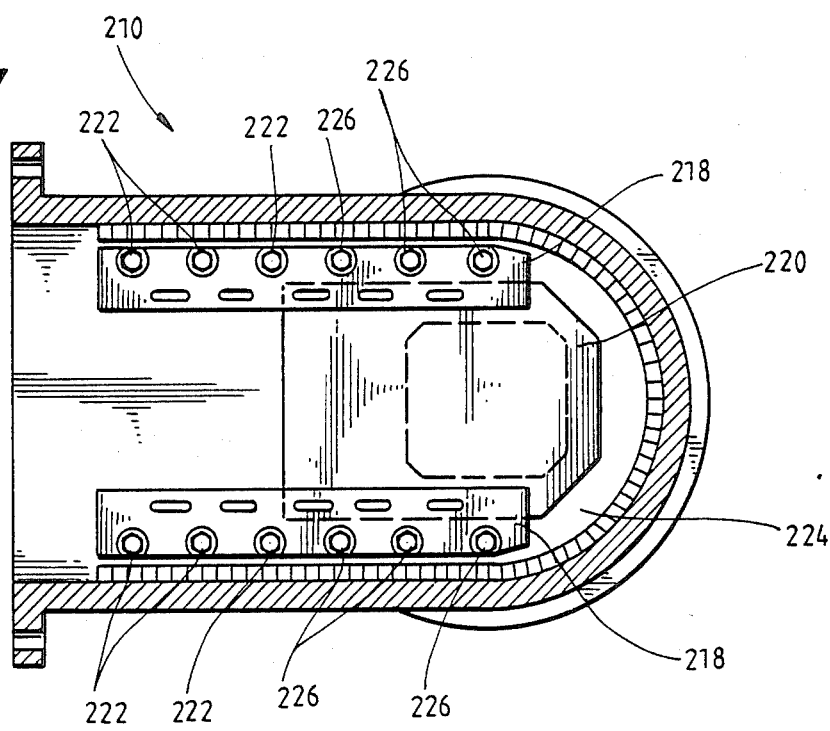
FIG. 11 is a bottom view of the guides and orifice plate of the valve of FIG. 9.

The valve 210 illustrated in FIG. 9-11 has the inlet 212, the outlet 214, and the bonnet 216. The guides 218 for the disc 220 are bolted to the top of the bonnet 216 by the bolts 222 and to the seat ring 224 by the bolts 226. The orifice plate 228 is welded to the seat ring 224 at the points 228a and 228b (Of course the welding is accomplished to such an extent in these areas that the plate is securely held. By using the terms "points 228a and 228b" it is not meant that only individual small points of welding material or used or that the area welded is necessarily as small as a point). Again as in the other figures square hatching about the interior body of the valve 210 and on various parts indicates the preferred use of a liner of "Hex" steel and refractory material. The welding of the orifice plate 228 is around its entire periphery so that it is sealed in place (as is the plate 30 of valve 10)

The valve 310 shown in FIGS. 12–14 has a removeable guide and orifice plate assembly that includes the guides 312 and the orifice plate 314. Once the guides 312 are bolted to the orifice plate 314 with the bolts 316, then the guide-plate assembly can be installed in the valve 310 as a unit and bolted to the seat ring 318 with the bolts 320 and to the valve bonnet 322 with the bolts 324. Each guide 312 has a series of self-cleaning slots 326 therethrough. Each guide 312 has a recess 328 for collecting unwanted solids. If the valve 310 of FIG. 12 is used in a inverted fashion, then an indexing tang such as tang 40 of valve 10 will be useful with valve 310's guides.

Figure 15:
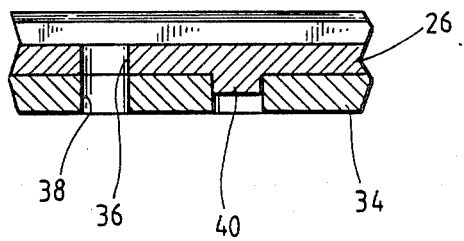
FIG. 15 is a side cross sectional view of the guide of FIG. 1's valve showing the indexing tang.

FIG. 15 illustrates the tang 40 of the valve 10. The tang 40 of the guide 26 is either connected to or formed integrally of (preferred form) the guide 26 and is fashioned to be receivable in the recess 42 of the body shelf 34.

In conclusion, therefore, the present invention and the embodiments disclosed herein are well adapted to carry out the objectives and obtain the ends set forth as well as others inherent therein. One of skill in this art who has the benefit of this invention's teachings will see that certain changes can be made in the various combinations and structures disclosed herein without departing from the spirit and scope this invention as claimed below.

What is claimed is:

1. A valve, the valve having
   body means,
   the body means having
      inlet means,
      outlet means, and
      disc means,
   the disc means disposed within the body means and movable to close off or open the valve,
   the disc means movably mounted on guide means, the guide means secured to the interior of the body means,
   the guide means having slot means therethrough for conducting through the guide means material falling thereon, and
   the guide means mounted on shelf means for supporting and mounting the guide means, the shelf means mountable to the valve body means and having shelf slot means disposed so that material flowing through the guide slot means then flows into and through the shelf slot means.

2. The valve of claim 1 wherein the guide means has recess means therealong for receiving material deposited on the guide means.

3. The valve of claim 2 wherein the slot means extend from the recess means to the bottom of the guide means.

4. The valve of claim 1 wherein the guide means is a continuous integral single member.

5. The valve of claim 1 wherein the portions of the guide means which come into contact with the disc means are protected with hardfacing material on those portions.

6. The valve of claim 1 wherein the shelf means is a continuous integral single member.

7. The valve of claim 1 wherein the guide means are mounted to the shelf means by an indexing tang connected to and extending downwardly from the guide means, the indexing tang receivable and received within a tang recess formed in the shelf means.

8. The valve of claim 7 wherein the guide means is mounted to the shelf means solely by the indexing tang.

9. The valve of claim 1 wherein the body means is lined with refractory material.

10. a valve, the valve having
 body means,
 the body means having
  inlet means,
  outlet means, and
  disc means,
 the disc means disposed within the body means and movable to close off or open the valve,
  the disc means movably mounted on guide means, the guide means secured to the interior of the body means,
  the guide means having guide slot means therethrough extending from the recess means to the bottom of the guide means for conducting through the guide means material falling thereon, the guide means having recess means therealong for receiving material deposited on the guide means, the guide means mounted on shelf means for supporting and mounting the guide means, the shelf means mounted on the body means and having shelf slot means therethrough and disposed so that material flowing through the guide slot means flows into and through the shelf slot means.

11. A guide means for guiding a gate means in a valve, the valve having body means, the body means having inlet means, outlet means and the disc means, the gate means disposed within the body means and movable to close off or open the valve, the gate means movably mounted on the guide means, the guide means comprising,
 guide member means secured to the interior of the body means, the gate means movably disposed on the guide member means,
 the guide member means having guide slot means therethrough for receiving and transmitting beyond the guide means material deposited thereon, and
 the guide means mounted on shelf means for supporting and mounting the guide means, the shelf means mountable to the valve body means and having shelf slot means disposed so that material flowing through the guide slot means then flows into and through the shelf slot means.

12. The guide means of claim 11 wherein the guide member means has recess means therealong for receiving the material, the guide slot means communicating with the recess means.

13. The guide means of claim 11 wherein the guide member means is a continuous integral single member.

14. The guide means of claim 11 wherein the portions of the guide member means which are contacted by the gate means are protected with hardfacing material.

15. A guide means for guiding a gate means in a valve, the valve having body means, the body means having inlet means, outlet means, and disc means, the gate means disposed within the body means and movable to close off or open the valve, the gate means movably mounted on the guide means, the guide means comprising,
 guide member means secured to the interior of the body means, the gate means movably disposed on the guide member means, the guide member means having recess means therealong for receiving the material,
 the guide member means having guide slot means therethrough for receiving and transmitting beyond the guide means material deposited thereon, the guide slot means communicating with the recess means, and
 the guide means mounted on shelf means for supporting and mounting the guide means, the shelf means mountable to the valve body means and having shelf slot means disposed so that material flowing through the guide slot means then flows into and through the shelf slot means.

* * * * *